(12) United States Patent
Puthuff et al.

(10) Patent No.: US 6,181,801 B1
(45) Date of Patent: *Jan. 30, 2001

(54) WIRED OPEN EAR CANAL EARPIECE

(75) Inventors: Steven H. Puthuff, Saratoga; Vincent Pluvinage, Atherton; Jon C. Taenzer, Los Altos, all of CA (US)

(73) Assignee: Resound Corporation, Redwood City, CA (US)

( * ) Notice: Under 35 U.S.C. 154(b), the term of this patent shall be extended for 0 days.

This patent is subject to a terminal disclaimer.

(21) Appl. No.: 08/833,064

(22) Filed: Apr. 3, 1997

(51) Int. Cl.[7] .................................................. H04R 25/00
(52) U.S. Cl. .......................... 381/380; 381/328; 381/330; 381/384
(58) Field of Search .................................... 381/23.1, 312, 381/314, 317, 318, 320, 321, 322, 323, 324, 327, 328, 330, 104, 106, 107, 370, 380, 381, 382, 384; 379/52, 430; 455/66, 90, 575

(56) References Cited

U.S. PATENT DOCUMENTS

| | | | |
|---|---|---|---|
| 2,874,231 | * 2/1959 | Wallace | 381/328 |
| 3,068,954 | * 12/1962 | Stralkowski | 381/328 |
| 3,209,080 | * 9/1965 | Guttner et al. | 381/330 |
| 3,278,912 | * 10/1966 | Waldhauer | 381/106 |
| 4,291,203 | 9/1981 | Bellafiore . | |
| 4,471,171 | * 9/1984 | Kopke | 381/312 |
| 5,031,219 | * 7/1991 | Ward et al. | 381/328 |
| 5,278,912 | 1/1994 | Waldhauer . | |
| 5,369,711 | * 11/1994 | Williamsons, III | 381/104 |
| 5,395,168 | 3/1995 | Leenen . | |
| 5,404,407 | * 4/1995 | Weiss | 381/322 |
| 5,452,361 | 9/1995 | Jones . | |
| 5,479,522 | 12/1995 | Lindemann et al. . | |
| 5,572,594 | * 11/1996 | Devoe et al. | 381/328 |
| 5,613,222 | * 3/1997 | Guenther | 381/380 |
| 5,712,917 | * 1/1998 | Offutt | 381/312 |
| 5,721,783 | 2/1998 | Anderson . | |
| 5,796,821 | * 8/1998 | Crouch et al. | 381/330 |
| 5,812,680 | * 9/1998 | Clendon | 381/328 |
| 6,021,207 | * 2/2000 | Puthuff et al. | 381/328 |

* cited by examiner

*Primary Examiner*—Huyen Le
(74) *Attorney, Agent, or Firm*—Burns, Doane, Swecker & Mathis L.L.P.

(57) ABSTRACT

A communications earpiece is disclosed which can be used by hearing impaired and non-hearing impaired users so as to be able to communicate with an external device such as personal communications nodes or cellular phones. A communications earpiece comprises a ear canal tube sized for positioning in an ear canal of a user so that the ear canal is at least partially open for directly receiving ambient sounds. A sound processor amplifies received ambient sounds to produced processed analog signals. A bidirectional wired connector is used for connecting the communications earpiece to external devices wherein the processed analog signals produced by the sound processor are sent to the external devices through the connector and signals from the external device are sent to the earpiece through the connector. The signals sent from the external device to the earpiece are then applied to the speaker in the earpiece.

42 Claims, 9 Drawing Sheets

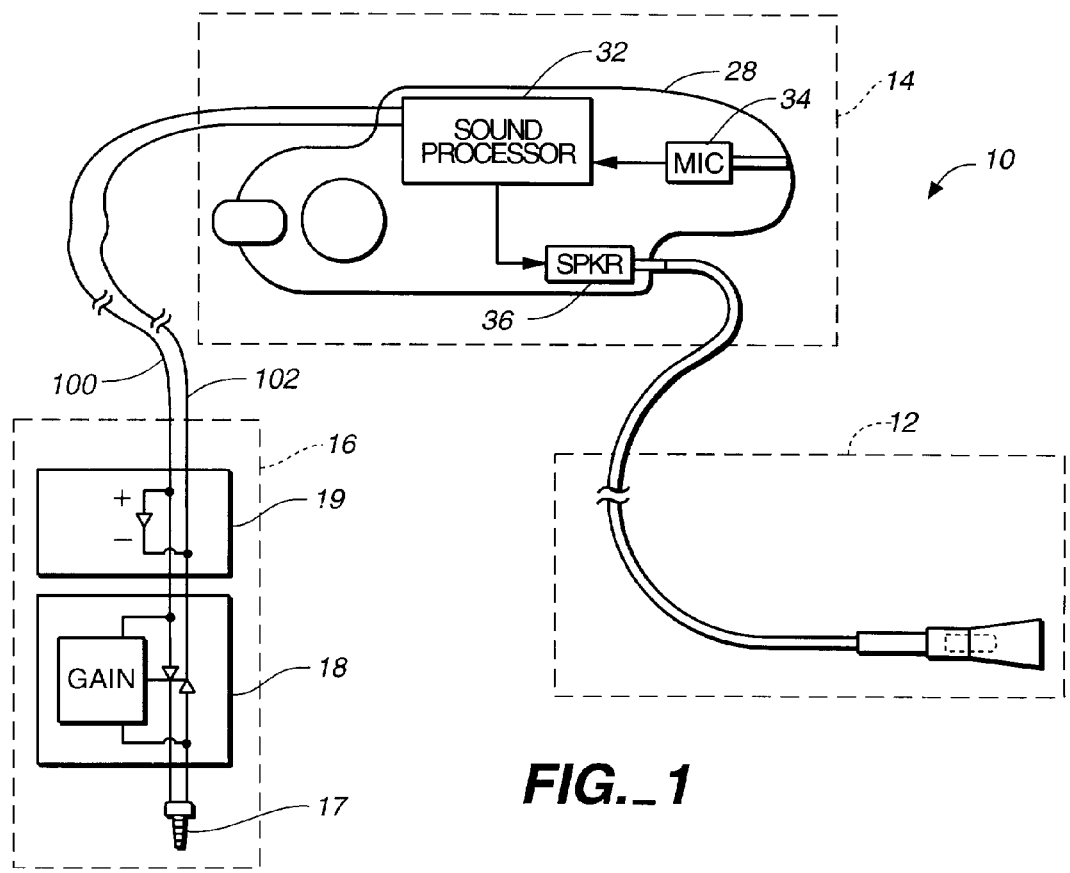
FIG._1
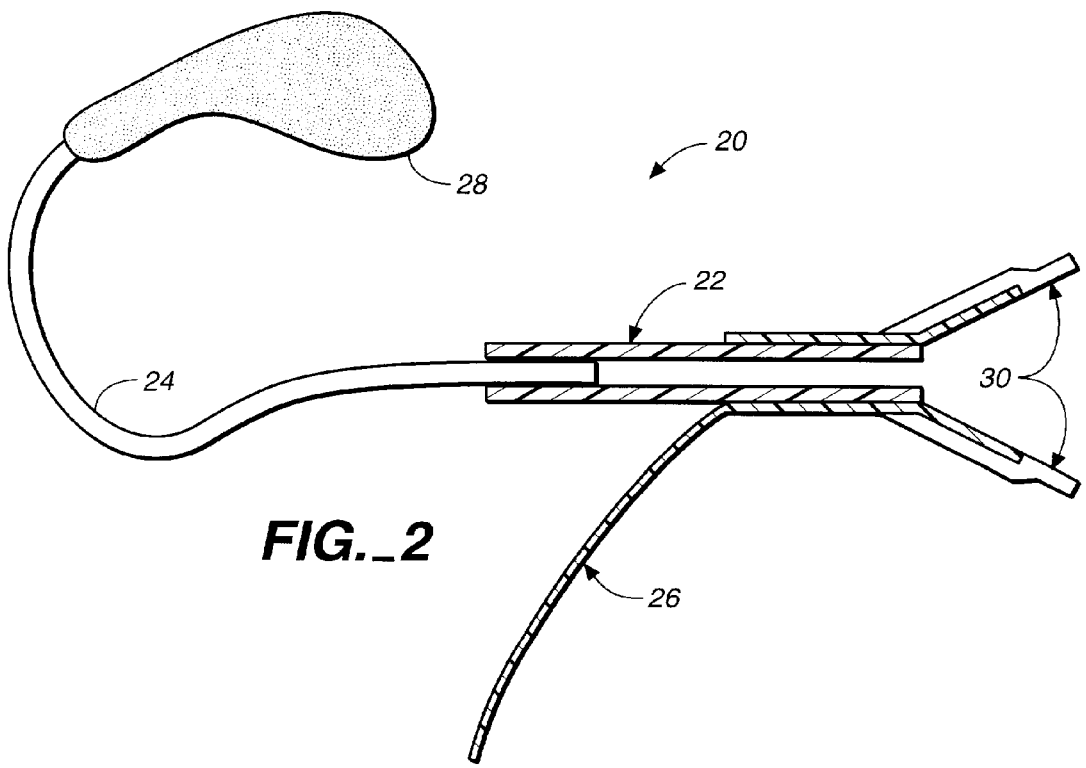
FIG._2

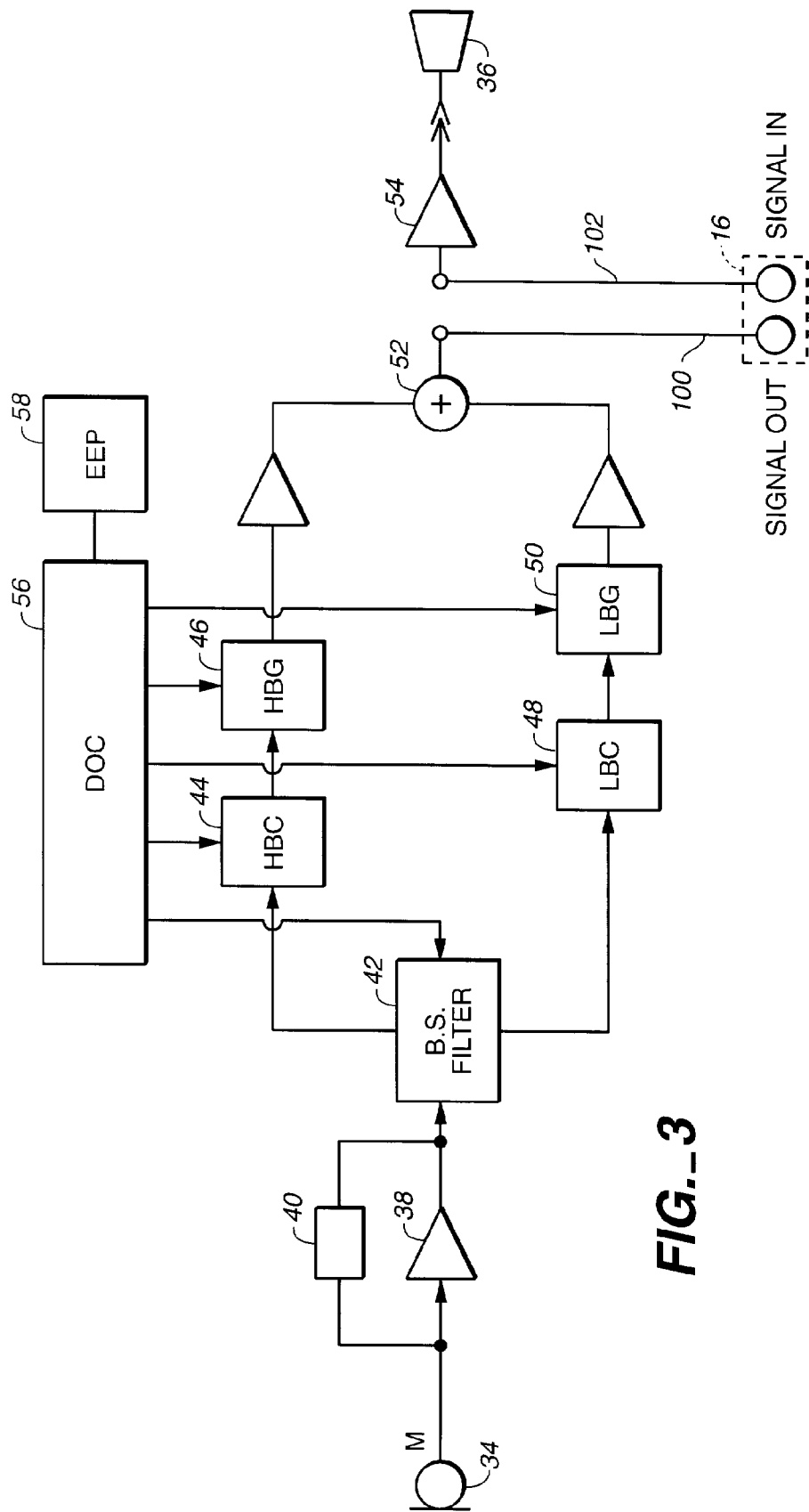
FIG._3

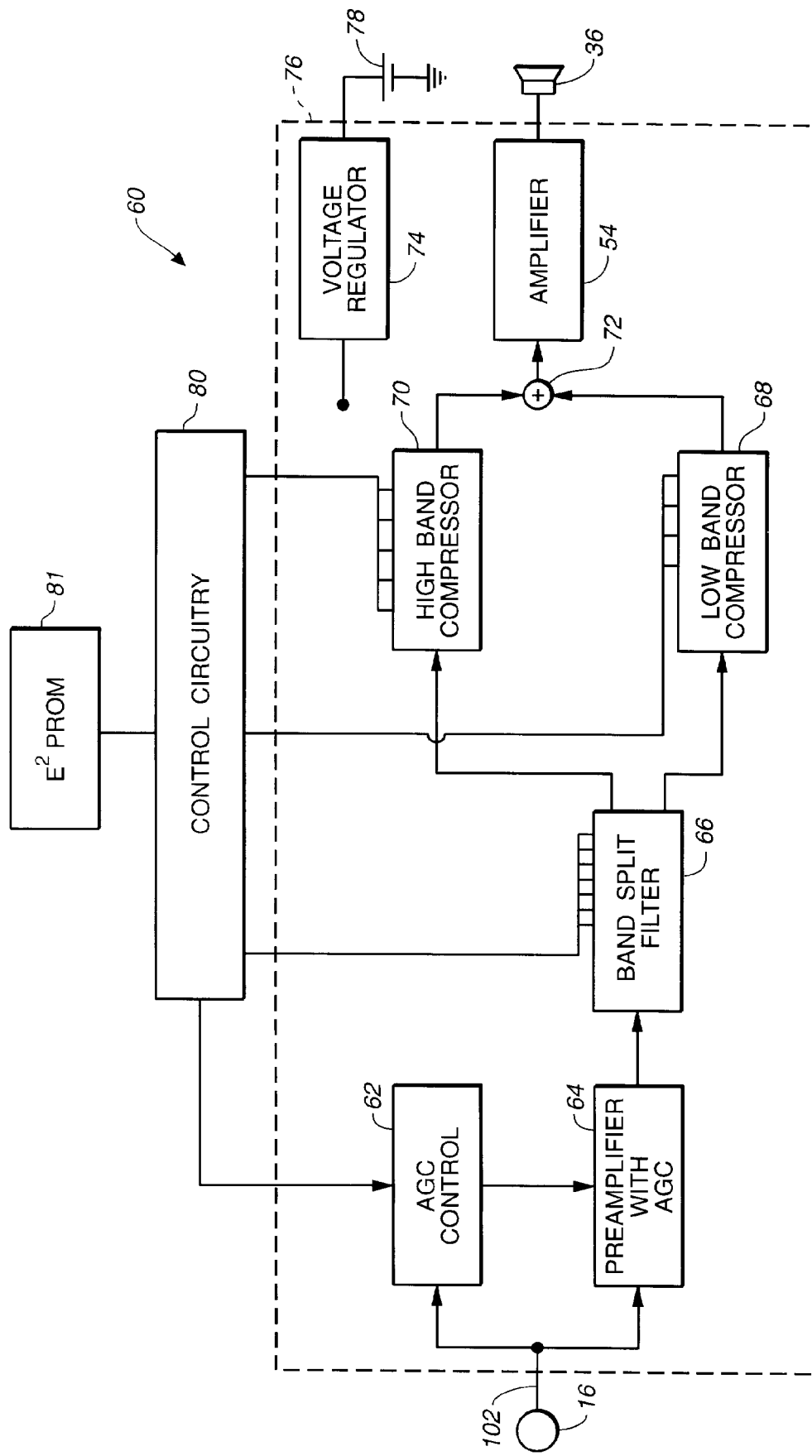
FIG._4

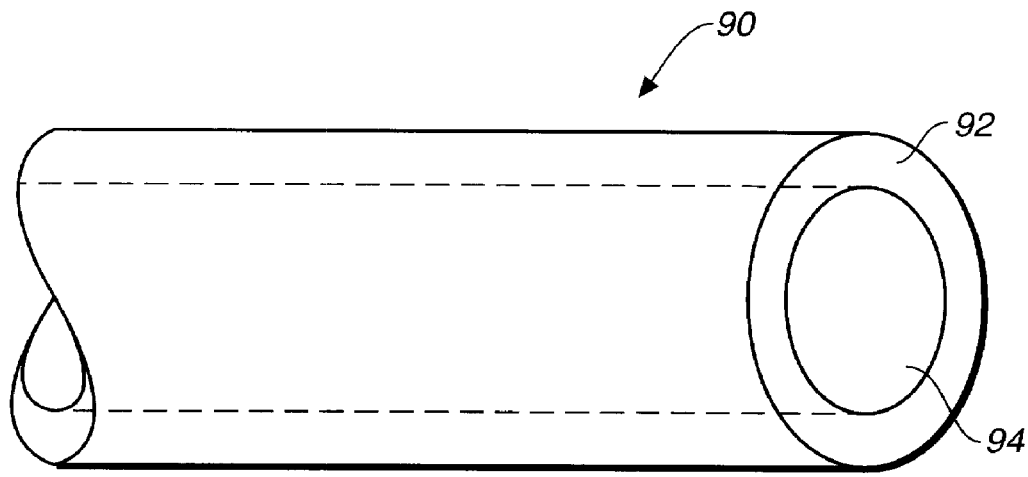
FIG._5
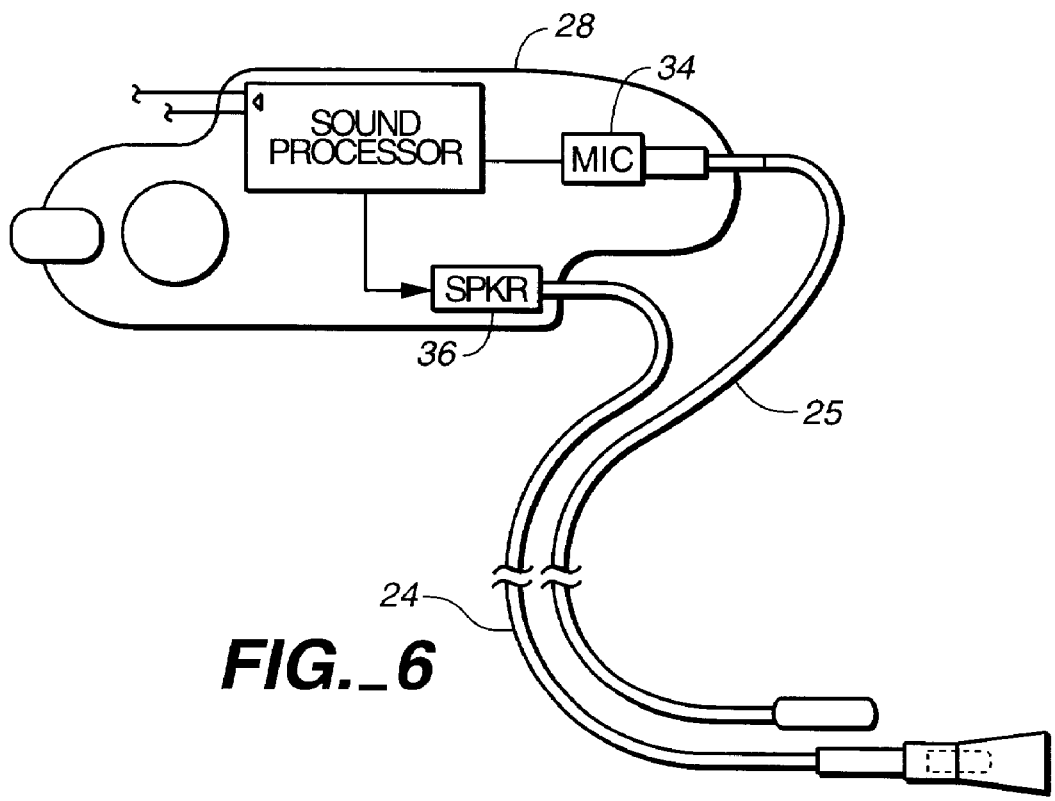
FIG._6

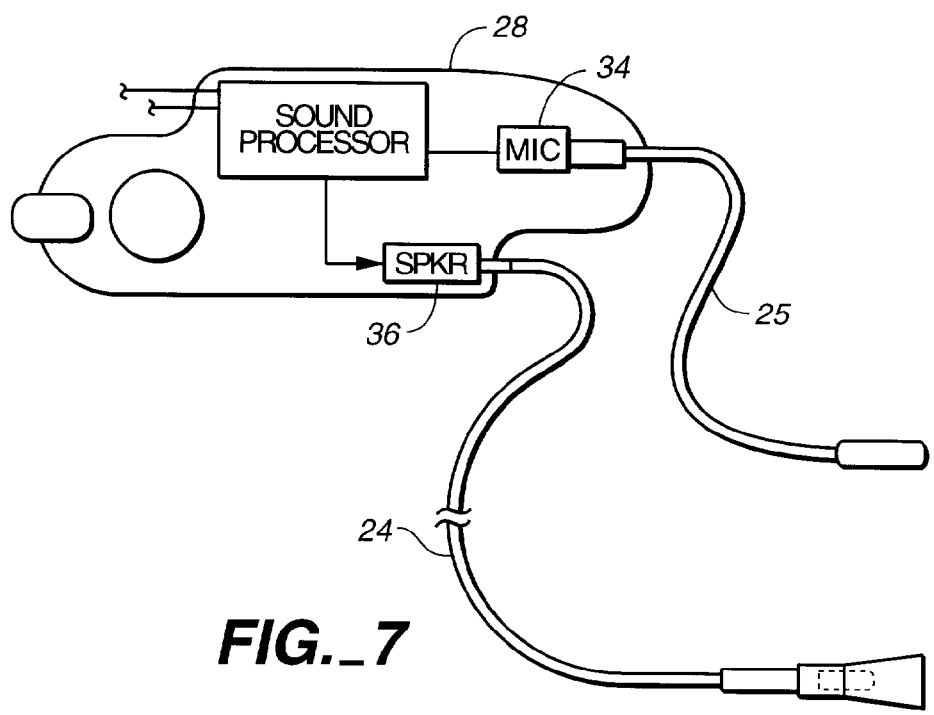
FIG._7
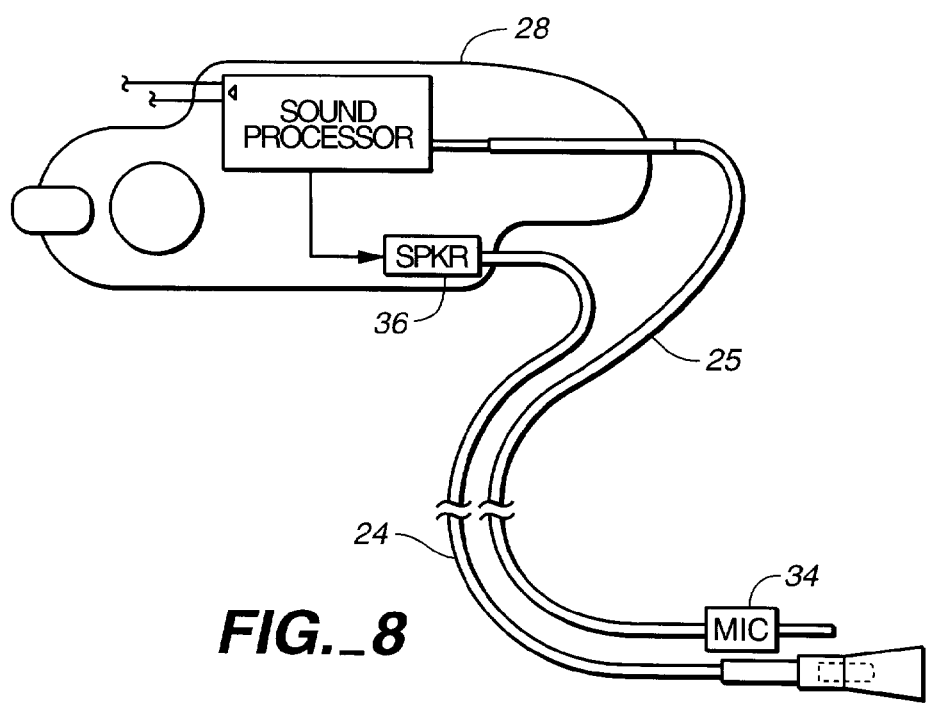
FIG._8

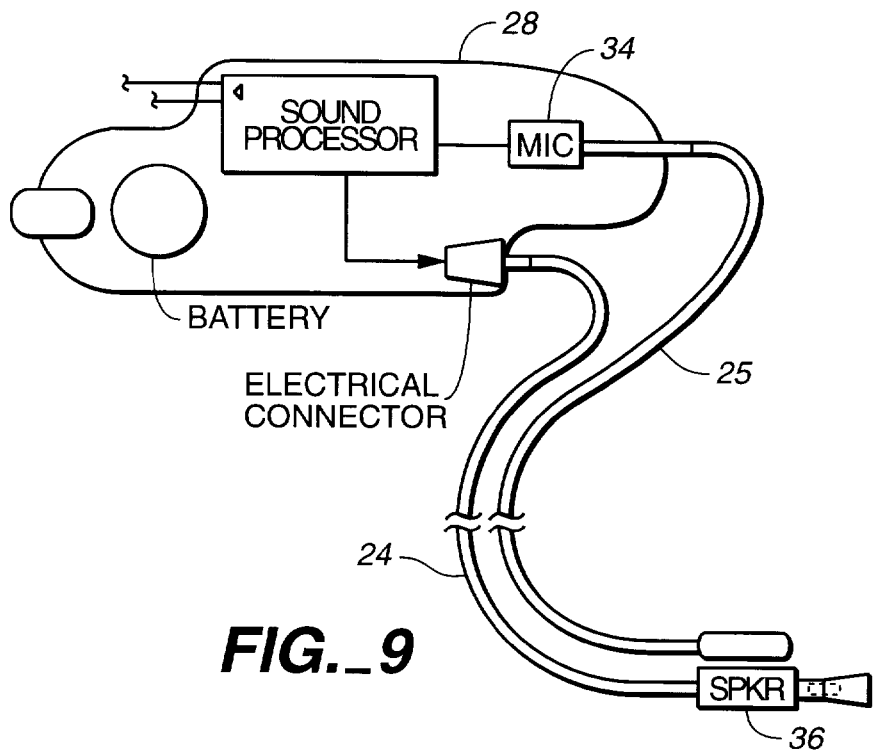
FIG._9
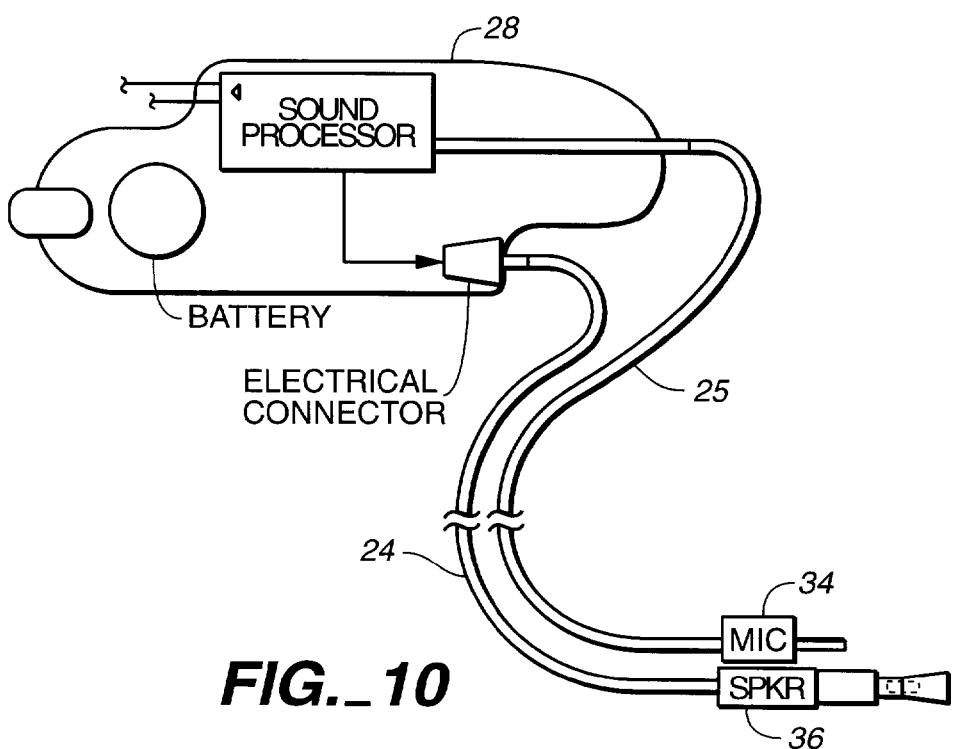
FIG._10

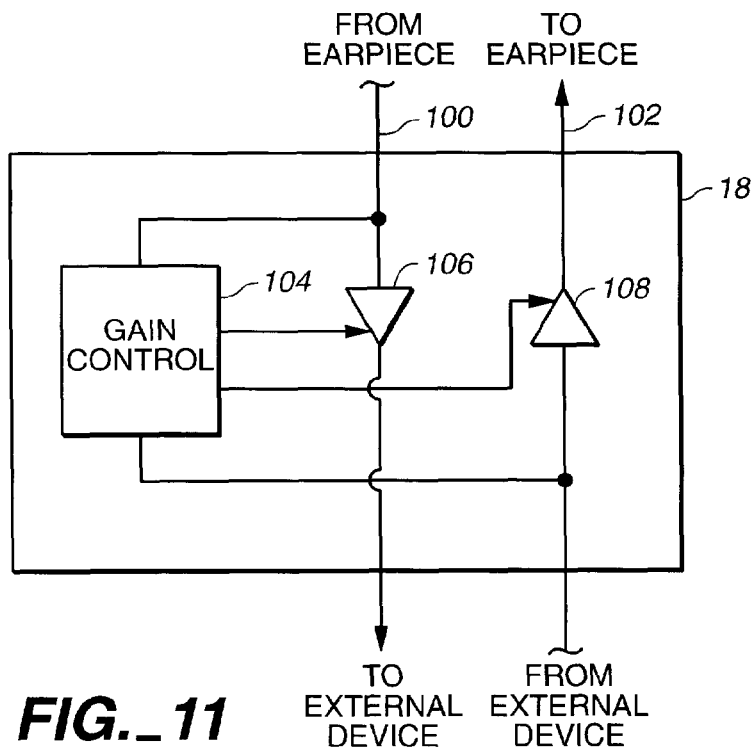
FIG._11
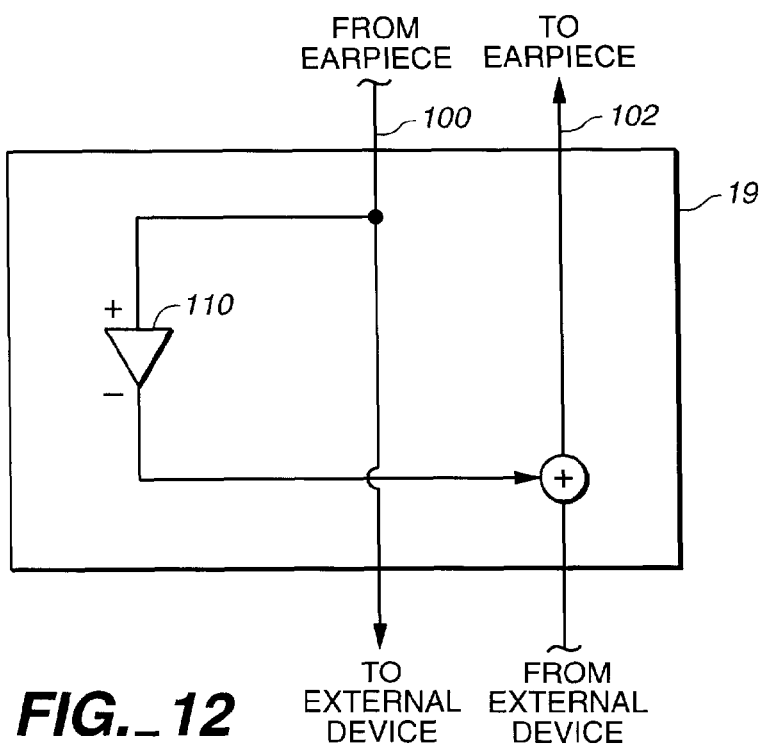
FIG._12

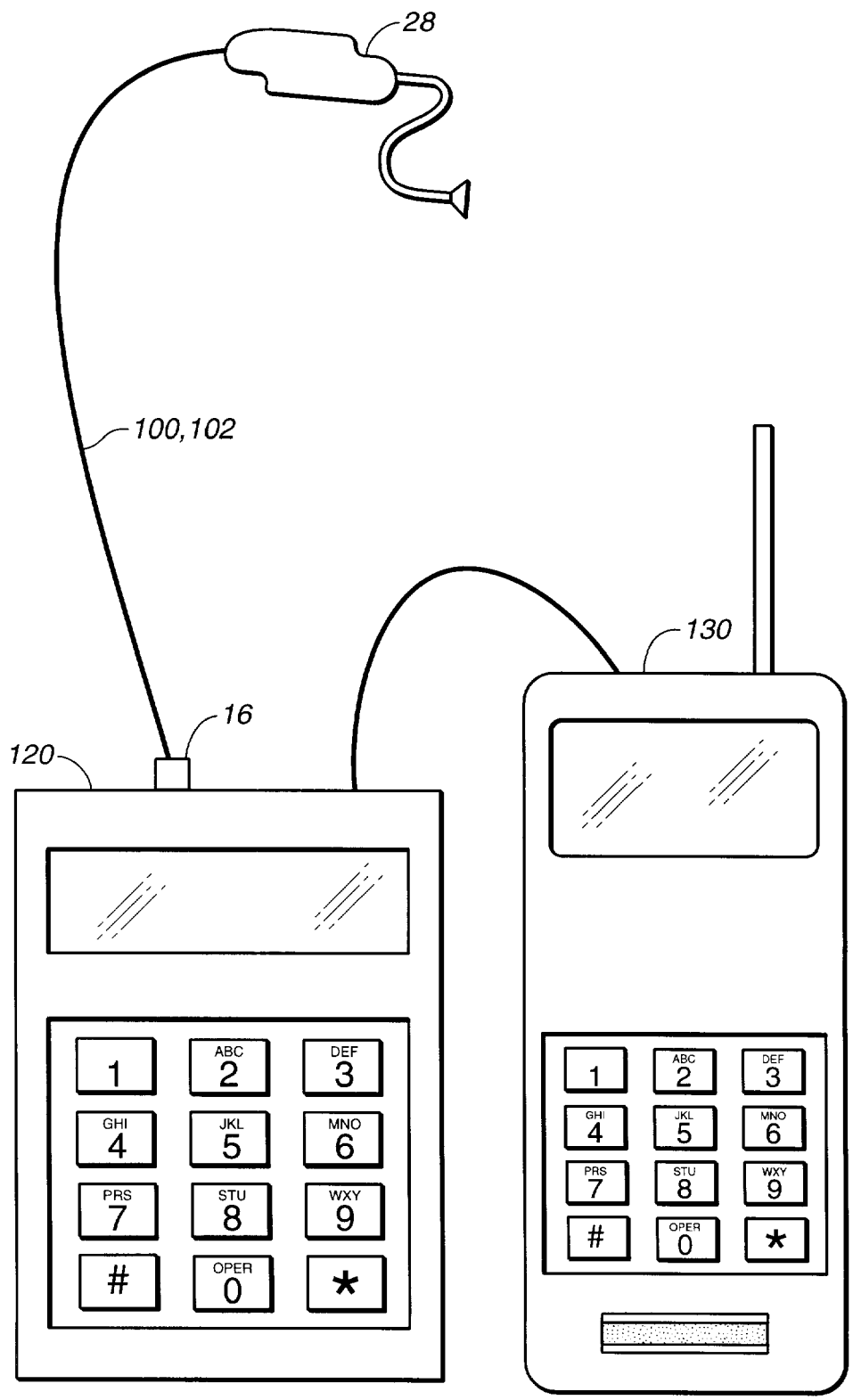
FIG._13

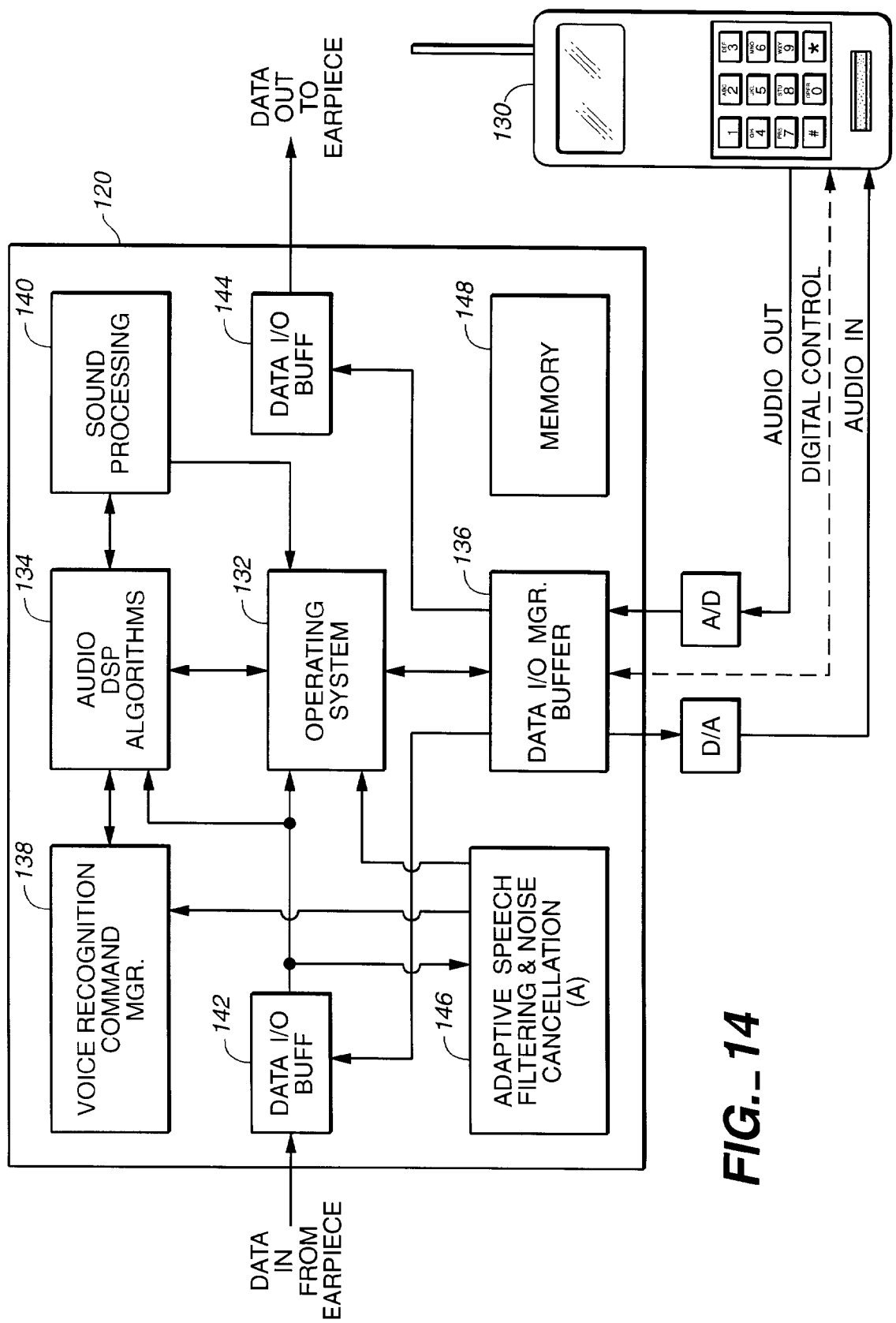
FIG._14

WIRED OPEN EAR CANAL EARPIECE

BACKGROUND OF THE INVENTION

1. Field of the Invention

The present invention relates to an open ear canal earpiece, and more particularly to an open ear canal earpiece which is capable of communicating with external electronic devices via a wired link.

2. State of the Art

The communications industry has been in a rapid growth state for the past decade. The result of such growth has been the proliferation of two-way communications systems, e.g. telephones, cellular phones, and computer networks, and thus the ability to contact someone when they are away from the house or the office. Hands free methods of communicating often include a headset with a boom microphone. The headset can either have one or two earpieces which fit over the ear and a boom mike which is attached to the earpiece assembly and extends out toward the user's mouth. The headset is either secured by resting on the user's head or is secured by being attached behind the user's ear. The problem with this assembly is that it is cosmetically unattractive and uncomfortable to wear for long periods of time. Furthermore, it is large, highly visible, cumbersome, and unsuitable for hands free operation while driving, walking, or even running.

Another problem with the traditional headset and boom mike assemblies is that these assemblies do not modify the voice signals in the earpiece so as to allow for the correction of various hearing impairments. Conventional hearing aids are typically employed that are configured to fit either behind the ear or in the ear. Through various signal processing techniques, sounds to be delivered to the ear are processed to facilitate and optimize the hearing of the user throughout the usable audible frequency range. However, these devices block the ear canal so that little or no sounds reach the ear in a natural, unaided manner. Furthermore, such devices have drawbacks, such as feedback, when used with communication devices such as telephones.

Conventional hearing aids generally provide adequate processing throughout the entire speech frequency range for most hearing impairments. However, these types of devices are not optimal for people having mild hearing losses for a number of reasons. Conventional hearing aids can unnecessarily amplify loud sounds so that these sounds become uncomfortable and annoying to the mild hearing loss users. In many hearing aids, such loud sounds are also distorted by the sound processing circuitry, significantly reducing the intelligibility of speech or the quality of other sounds. In addition, these types of hearing aids often introduce phase shifts to received sounds, resulting in a reduction of the user's ability to localize sound sources. These hearing aids can therefore degrade certain sounds that the mild hearing loss user could otherwise hear adequately without any aid. Conventional hearing aid systems cause a problem known as the occlusion effect. The occlusion effect is the increased loudness of low frequency sounds due to transmission of sound by tissue conduction when the ear canal is blocked and air conduction is impeded, resulting in sounds which are both unnatural and uncomfortable for the user. Additionally, these hearing aids are overly complicated and burdensome to users having mild hearing losses.

Thus, there is a need for an earpiece which is unobtrusive, less noticeable by the wearer, less visible to others, cosmetically attractive, which is suitable for both hearing impairment and communications industries, and which does not block the entire ear canal of the user.

SUMMARY OF THE INVENTION

The present invention is directed to an earpiece which can be used by hearing impaired and non-hearing impaired users to communicate with external devices, e.g., landline and wireless communication networks. Exemplary embodiments of a communications earpiece in accordance with the present invention comprise an ear canal tube sized for positioning in an ear canal of a user so that the ear canal is at least partially open for directly receiving ambient sounds without amplification. A sound processor is also provided to process the received ambient sounds to produce processed signals. A bidirectional wired connector connects the earpiece to external devices, with the processed signals produced by the sound processor being sent to the external devices through the connector and with signals from the external device being sent to the earpiece through the connector. The signals sent from the external devices to the earpiece are supplied to a speaker in the earpiece. The received and processed signals can also be used to create noise cancellation and/or enhance the use of the earpiece as a communications product.

According to an alternate embodiment, the communications earpiece is configured to fit entirely in the ear canal wherein the ear canal is at least partially open for receiving ambient sounds.

BRIEF DESCRIPTION OF THE DRAWINGS

These and other objects will be fully understood through the description below and the accompanying drawings, in which:

FIG. 1 illustrates a wired open ear canal earpiece according to an exemplary embodiment of the present invention;

FIG. 2 illustrates an open ear canal earpiece;

FIG. 3 is a block diagram of a wired open ear canal earpiece according to an exemplary embodiment of the present invention;

FIG. 4 illustrates a multiband compression system for compensating hearing impairments according to an exemplary embodiment of the present invention;

FIGS. 5–10 illustrate several earpiece systems according to exemplary embodiments of the present invention;

FIG. 11 illustrates an auto balancing circuit according to an exemplary embodiment of the present invention;

FIG. 12 illustrates an anti-feedback circuit according to an exemplary embodiment of the present invention;

FIG. 13 illustrates an exemplary remote processing unit which can be used in conjunction with exemplary embodiments of the present invention; and FIG. 14 illustrates the remote processing unit of FIG. 12 in greater detail.

DETAILED DESCRIPTION OF THE PREFERRED EMBODIMENTS

FIG. 1 illustrates an open ear canal earpiece which can be used as a hearing aid/communications device. The earpiece 10 is comprised of three main sections: an ear tube section 12, a sound processing section 14, and a bidirectional wired connector 16 which can be used to electronically connect the earpiece to different electronic devices as will be described below.

FIG. 2 provides a more detailed view of the ear tube section 12. The open ear canal earpiece 20 includes an ear canal tube 22 sized for positioning in the ear of a user so that the ear canal is at least partially open for directly receiving ambient sounds. The ear canal tube 22 is connected to a earpiece tube 24. This connection can be made by tapering the ear canal tube 22 so that the earpiece tube 24 and the ear canal tube 22 fit securely together. Alternatively, a connector or the like can be used for connecting the ear canal tube 22 and the earpiece tube 24, or the earpiece tube 24 and the ear canal tube 22 can be incorporated into a single tube. An example of such an open ear canal earpiece is disclosed in U.S. patent application Ser. No. 08/832,508 entitled "Open Ear Canal Hearing Aid System", filed Jan. 10, 1997, the disclosure of which is hereby incorporated by reference in its entirety. The earpiece tube 24 is also connected to a case 28.

FIG. 2 further illustrates a barb 26 that can be attached to one side of the ear canal tube 22. The barb 26 extends outward from the ear canal tube 22 so that it lodges behind the tragus to keep the ear canal tube 22 properly positioned in the ear canal. The barb 26 can be made of soft material, (e.g., rubber like material), so as not to scratch the ear tissue. At the ear of the ear canal tube 22, the tip 30 can be soft so that the ear canal wall does not become scratched.

The tube 22 can be formed to the contour of the ear and can be made of a material that has some stiffness (e.g., plastic or other material). This makes the whole assembly, including the case 28, the tubes 22 and 24, the barb 26, and the tip 30, work as a unit to maintain all components in position during use. The tube 22 can be made flexible enough to allow the tip of the tube to be inserted and removed easily from the ear.

Referring to FIG. 1, the sound processing section 14 is enclosed in the case 28, and includes a sound processor 32, a microphone 34, and a speaker 36. According to an exemplary embodiment, the case 28 is configured to fit behind the ear. However, the case 28 can also be configured to fit in other comfortable or convenient locations. For example, the case 28 can be attached to or embedded in an eyeglass frame or be small enough to fit into the ear.

FIG. 3 illustrates exemplary components within the sound processing section 14. The earpiece receives an audible signal using the microphone 34. The output of the microphone 34 is coupled to a preamplifier 38 and an automatic gain control circuit 40. The outputs of the preamplifier and the automatic gain control circuit are coupled to a programmable band split filter 42 which separates the audio signal into a plurality of bands, for example, high and low frequency bands where the high frequency band can include signals having a frequency greater than 900 Hz, while the low frequency band can include signals with frequencies less than 900 Hz.

Several advantages can be realized by splitting the signal into a plurality of bands. For example, the spectrum of most background noise, especially in a car, has its greatest energy in the lower frequencies. As the frequency increases, the energy of the noise usually decreases. Thus, the high energy signals from the background noise are usually at lower frequencies. The human voice has energies both in the low frequency band and the high frequency band, but the intelligibility of the human voice comes more from the high frequency band. Because signals in the high frequency band can also have less energy (i.e., be quieter) than the signals produced by low frequency background noise, well known human psychophysiological constraints result in an upward spread of masking. In other words, the high energy, low frequency signals mask the intelligibility of low energy, high frequency signals. As a result, even though the two signals are not in the same frequency band, a loud, low frequency noise can drown out a soft, high frequency noise.

By dividing the signal into low band and high band frequencies, the invention can process each band independently. For example, in the low frequency band, the amplification can be decreased for high energy sounds so that the high energy, low frequency sounds no longer mask the quieter high frequency sounds. In addition, high frequency signals can be amplified to boost this energy so that they are more audible. The dual action of decreasing the low frequency, high energy noise and boosting the high frequency, low energy sounds, increases the intelligibility of the signal before the signal is sent to the cellular phone or other external device.

The high band manipulation of the FIG. 3 programmable compressor system occurs in the high band compressor 44 and the high band gain controller 46, while the low band frequencies are manipulated by the low band compressor 48 and the low band gain controller 50. The processed high band and low band signals are then combined in a summing circuit 52 and is sent to the bidirectional wired connector 16 so as to be provided to the external device. The connector 16 also receives signals from the external devices and routes the audio signals to an amplifier 54 which amplifies the incoming audio signal to a level sufficient to drive the speaker 36.

Multiband compression operation is disclosed in, for example, U.S. Pat. Nos. 5,278,912 and 5,488,668 to Waldhauer, both of which are incorporated herein by reference. The programmable multiband compressor system is adapted to receive a plurality of control signals which may be generated by an external control circuit 56 and an associated memory $E^2PROM$ 58. The control circuit 56 is coupled to the band split filter 42, and the low and high band compressors 44 and 48, respectively, and to high and low band gain controllers 46 and 50, respectively. The control signals generated by the control circuit 56 are adapted to control the frequency split between the low and high frequency band as well as the compression and gain ratio of the low and high band compressors 44 and 48 and gain controllers 46 and 50 to generate a desired response for the system. The case 28 can also employ a second multiband compression system (e.g., identical to that shown in FIG. 3) located in the receive path from the external network device so as to modify the signal from the external network device before it is applied to the amplifier 54 so as to modify the audio signal for a hearing impaired user.

Referring to FIG. 4, another illustration of the FIG. 3 programmable multiband compressor system is provided. In FIG. 4, the programmable multiband compressor system 60 receives the audio signal from the external network device through the bidirectional wired link 16 and is applied to a preamplifier 64 and automatic gain control circuit (AGC) 62. The output of the preamplifier and the automatic gain control circuit is coupled to a programmable band split filter 66 which separates the audio signal into high and low frequency bands. The low frequency band output of programmable band split filter 66 is coupled to programmable compressor 68 and the high frequency band output of programmable band split filter 66 is coupled to programmable compressor 70. The output signals of the low band compressor 68 and the high band compressor 70 are coupled to respective inputs of a summing circuit 72 which combines the output signals to produce a composite audio signal. The output of the summing circuit is then coupled to an amplifier which amplifies the composite audio signal to a level sufficient to drive the speaker 36 which is coupled to the output of the amplifier 54. The system 60 further includes a voltage regulator 74 for supplying a regulated voltage to various circuits of the system 60. As will be appreciated from the discussion below, the programmable multiband compressor system 60 can be implemented on an integrated circuit and all of the circuits enclosed in the area 76 can be constructed on a single integrated circuit substrate. The programmable multiband compressor system 60 can be powered by a single cell, low voltage battery 78.

The programmable multiband compressor system 60 is adapted to receive a plurality of control signals which may be generated by an external or internal control circuit 80 and an associated memory E²PROM 81. The control circuit 80 is coupled to the band split filter 66 and the low and high band compressors 68 and 70, respectively. The control signals generated by the control circuit 80 are adapted to control the frequency split between the low and high frequency band as well as the gain and compression ratio of the low and high band compressors 68 and 70, to generate a desired response for the system 60 to compensate for virtually any type of hearing impairment.

It will be understood by those skilled in the art that a system which contains two multiband compressor systems can be configured in such a manner to share at least some like components.

The received and processed signals can also be used to create noise cancellation and/or enhance the use of the device as a communications product. Usually, noise picked up by the earpiece will be in one frequency range, for example, around 500 Hz while cognitive speech is in a second frequency range, for example over 1000 Hz. Thus, the earpiece can filter out signals in the 400–600 Hz range from the received signals. The resulting signals can then be amplified and inverted and sent to the speaker to be broadcast into the ear canal. The inverted signal will then substantially cancel the noise component of the sound in the ear canal around 500 Hz. The earpiece can also use the noise cancellation techniques disclosed in U.S. patent application Ser. No. 08/832,508, entitled "Noise Cancellation Earpiece", the contents of which are incorporated herein by reference in their entirety and filed on even date herewith. In addition part of the signal received at the microphone can be processed and sent back to the speaker to help the user hear his/her own voice which may be partially distorted because the earpiece partially occludes the ear.

In the earpiece described above, all of the electronic components of the earpiece, e.g., including the microphone and speaker, are included in the behind-the-ear component (case 28) of the earpiece. It will be understood by those skilled in the art that the earpiece can be configured to fit in the ear or ear canal so long as the ear canal is at least partially open for directly receiving ambient sounds. For example, the earpiece can be shaped like an open cylinder with thick walls, wherein the opening in the middle of the cylinder allows ambient sound to enter the ear canal and all of the electrical components are located in the walls of the cylinder, as illustrated in FIG. 5, but the invention is not limited thereto.

According to alternate embodiments, the microphone and speaker can be placed in various locations outside of the case 28. According to one embodiment illustrated in FIG. 6, a tube 90 is connected to the input of the microphone 34 and the tube is extended into the ear canal of the user. The open end of the tube 90 located in the ear canal allows sounds in the ear canal to enter the tube which then propagate to the input of the microphone 34. Alternately, the tube 90 can extend from the microphone 34 but be located outside the ear canal to reduce the feedback caused by sounds from the speaker being picked up by the microphone 34, as illustrated in FIG. 7.

In another embodiment illustrated in FIG. 8, rather than using a tube to deliver the sound to an input of the microphone 34, the microphone is moved from the case 28 to the end of the ear canal tube 90 located in the ear canal. In this embodiment, outputs from the microphone are transferred electrically via a plurality of wires located in the ear canal tube 90 to the case 28 for processing.

Likewise, as illustrated in FIG. 9, the speaker can be moved from the case 28 into the ear canal tube. Alternately, both the microphone and the speaker of the BTE component are moved into the in-the-canal device, wherein a plurality of wires (e.g., 3 for the microphone and 3 for the speaker) pass through one or more tubes to the electronic signal processing components located in the case 28, as illustrated in FIG. 10. It will be understood by one skilled in the art that the microphone and speaker can also be located anywhere between the case 28 and the end of the ear canal tube(s).

Referring back to FIG. 1, the connector 16 includes a physical connector 17 which is plugged into a jack, for instance a headset jack, of an external device, such as a personal communications node as described in copending application Ser. No. 08/758,365, filed Dec. 3, 1996, entitled "Personal Communication Device", the disclosure of which is hereby incorporated by reference in its entirety, or a cellular phone. The connector 16 can also include additional processing circuitry such as an auto balancing circuit 18 and/or an anti-feedback circuit adapter 19. Those skilled in the art will appreciate that all processing need not be at the earpiece; the processing can also be in the connector or in the PCN or cellular phone. Alternately, the battery can be in the connector to reduce the weight of the earpiece and/or make it easier to change the batteries or to accommodate a large battery for extended use.

Different types of cellular phones have different amplitude levels at the headset jack. For the earpiece to be able to properly communicate with the cellular phone through the headset jack, the amplitude levels of the earpiece and the cellular phone need to match. To make the amplitude levels match, the present exemplary embodiments use the auto balancing circuit 18. An example of an auto balancing circuit is illustrated in FIG. 11.

In FIG. 11, an amplifier 106 is placed on the output line 100, i.e, the line transferring signals from the earpiece to the external device, of the connector 16 and an amplifier 108 is attached to the input line 102, i.e., the line transferring signals from the external network device to the earpiece of the connector 16. A gain controller 104 is used to control the gain of both of the amplifiers until the outputs match the levels required by the sound processing system and the cellular phone. Basically, the auto balancing circuit sends a signal into the external network device on the output 100 line and detects the signal coming back on the input 102 line. The auto balancing circuit then adjusts the gain of the amplifiers until the amplitudes of the signals match. It will be understood that other auto balancing circuits can also be used in accordance with the present invention and the invention is not limited to the FIG. 11 embodiment.

In telephones, including cellular phones, the voice of the user is picked up by the microphone and a portion of the voice signal is fed back to the earpiece so that the user can hear his own voice on the phone. According to exemplary embodiments, when the earpiece is attached to the phone, the portion of the user's voice fed back from the phone will be sent to the speaker and broadcast into the ear canal. If the signal is strong, or the speaker port and the microphone port are very close together, a feedback loop will be created because the microphone will pick up the fed back signal which may result in a whistling noise. In order to cancel out this feedback, an anti-feedback circuit 19, as illustrated in FIG. 12, diverts a portion of the output signal into an inverter 110. The inverter 110 inverts the signal and the inverted signal is summed with the input signal from the phone so as to cancel out the feedback. It will be understood that the summer can be used to provide gain adjustments and the inverter 110 can be used to provide phase and frequency adjustments to properly cancel the feedback. These adjustments can be made at the factory during manufacture or can be made by the user by turning a tuning knob (not illustrated) attached to the anti-feedback circuit adapter 19. Alternately, the adjustments can be made automatically with conventional control circuitry.

Another feedback problem occurs if there is a delay in the transmission link between the two users. During a conversation, the sound of the voice of the other person will be sent into the user's ear canal. That sound can be picked up by the microphone, which then sends the other user's voice back to the other user through the communications network. If there is any delay in the transmission link, an echo will be created. In order to compensate for this echo, another anti-feedback circuit can be added to FIG. 1. In this case, an input test signal is generated and the output signal is compared with the input signal to determine the transfer function that should be used to compensate for the echo problem.

As mentioned above, the earpiece can also be connected to a personal communications node (PCN). An exemplary personal communications node is described in the above mentioned U.S. patent application Ser. No. 08/758,365. FIG. 13 illustrates a personal communication node according to an exemplary embodiment of the present invention. For illustrative purposes, the PCN 120 is depicted in FIG. 13 as connected to a cellular telephone 130 adapted for connection directly to the PCN 120. The PCN 120 permits a user to control at least one remote device simply by issuing voice commands. PCN 120 recognizes and interprets the voice commands of the user, determines whether the commands are to be sent to a given remote device to which it is connected, and forwards the voice commands to the appropriate remote device, accordingly. For example, the PCN 120 can be connected directly to a cellular phone 130 that is adapted for connection to the PCN. The cellular phone 130 can be used in a normal manner by entering codes via a keypad or in response to voice commands forwarded by the PCN 120. It will be understood by those skilled in the art that a cellular phone without a keypad or display could also be used, and controlled solely by voice commands. Using the PCN 120 connected to the cellular telephone 130, a user can answer calls, initiate calls, receive or send messages and so on, simply by issuing voice commands. Likewise, the PCN can also be hooked up to other electronic devices such as computers, which can be controlled using the voice commands.

Referring to FIG. 14, the PCN 120 processes signals received via the microphone(s) in the earpiece(s) worn by the user. The signals include voice commands to control the cellular telephone 130 as well as voice data to be conducted over the cellular telephone network. The PCN 120 then sends the processed signals to the cellular telephone 130 when the signals relate to a call. The PCN 120 also processes signals from the cellular telephone 130 and transmits these signals via the wired or wireless bidirectional link to the earpiece. To perform these functions, the PCN 120 can include, among other features, an operating system 132, audio digital signal processing (DSP) algorithms 134, a data input/output (I/O) manager buffer 136, a voice recognition command manager 138, a sound processing system 140, data I/O buffers 142 and 144, an adaptive speech filtering and noise cancellation unit 146, and a memory unit 148 and/or any combination or subcombination of these components. It will be understood by those skilled in the art that D/A and A/D converters can also be included if the signals received from the earpiece are analog.

The operating system 132 includes hardware and/or software for scheduling software tasks, handling interrupt request scheduling, data input/output, and allocating memory for various applications in the PCN 120. The sound processing unit 140 includes basic hardware and/or software used, for example, in a hearing aid to enhance signal understanding and intelligibility. The sound processing unit 140 can be implemented with a remote processor, such as that described in copending U.S. patent application Ser. No. 08/479,629, the contents of which are incorporated herein by reference in their entirety. Furthermore, the sound processing unit 140 can be programmed to modify the signals in the same manner as the auto-balancing circuit 18 and the anti-feedback circuit 19 thereby alleviating the need for auto-balancing circuit 18 and the anti-feedback circuit 19. Furthermore, the noise cancellation processing can be performed by the sound processing unit 140.

The voice recognition command manager 138 includes hardware and/or software which interprets voice commands from the user. For example, a voice command can be interpreted as a command to direct the cellular telephone 130 to perform a certain function. The voice recognition command manager 138 can be implemented within a conventional voice recognition software such a Motorola's Lexicus Microbrain or the Voice Dialer, model VCS 2060 of Voice Control Systems, Inc. in Dallas, Tex. The voice recognition command manager 138 is trained ahead of time during a set-up phase to recognize the voice of a specific user. For example, the user simply speaks a series of selected words, and the voice recognition command manager 138 becomes programmed, i.e., trained, in a known fashion to recognize any word spoken by the user based on these selected words. The voice recognition command manager 138 can, for example, be language independent.

The voice recognition command manager 138 matches a voice command to a particular control function in a library or lookup table of memory 148. After matching the voice command to a particular control function and a particular remote device, the voice recognition command manager 138 can issue an appropriate control code to, for example, control gating of commands and/or data to one or more remote devices via the operating system.

The audio DSP algorithms unit 134 provides digital sound processing algorithms for the voice recognition command manager 138 in the sound processing unit 140 under the control of the operating system 132. The audio DSP algorithms unit 134 can be implemented in accordance with features described in U.S. Pat. No. 5,479,522 to Lindeman et al., the contents of which are hereby incorporated by reference in their entirety. The audio DSP algorithm unit 134 can also provide noise cancellation algorithms for the sound process unit 140.

The data I/O manager buffer 136 temporarily stores data, voice, and control signals. The personal communication device also includes an adaptive speech filtering and noise cancellation unit 146 which enhances signal quality by filtering and cancelling noise in the signal. The adaptive speech filtering and noise cancellation unit 146 can be implemented in accordance with, for example, U.S. Pat. No. 5,140,640 to Graupe et al. and/or U.S. Pat. No. 5,452,361 to Jones entitled "Reduced VLF Overload Susceptibility Active Noise Cancellation Headset" assigned to Noise Cancellation Technology (NCT), the contents of which are incorporated herein by reference in their entireties.

It will be appreciated by those of ordinary skill in the art that the present invention can be embodied in other specific forms without departing from the spirit or essential character thereof. The presently disclosed embodiments are therefor considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. A communications earpiece, comprising:
    an ear canal tube sized for positioning in an ear canal of a user so that the ear canal is at least partially open for directly receiving ambient sounds;
    a sound processor for processing ambient sounds received by a microphone to produce processed sound signals; and
    a wired connector for connecting said communications earpiece to at least one external device wherein the processed sound signals produced by the sound processor are sent to the external device through said connector and signals from the external device are sent to the earpiece through the connector to be broadcast by a speaker into said ear canal tube.

2. A communications earpiece according to claim 1, wherein said sound processor includes a multiband compression system for modifying the received ambient sounds to improve intelligibility of the signal.

3. A communications earpiece according to claim 2, wherein said multiband compression system reduces gain of processed background noise signals at low frequencies in said received ambient sounds.

4. A communications earpiece according to claim 2, wherein said multiband compression system increases gain of low energy, high frequency signals in said received ambient sounds.

5. A communications earpiece according to claim 1, wherein the connector connects the communications earpiece to a personal communications node.

6. A communications earpiece according to claim 5, wherein said personal communications node connects to a two-way communications device so as to allow signals to pass between the earpiece and the two-way communications device.

7. A communications earpiece according to claim 5, wherein said personal communications node includes a sound processing system.

8. A communications earpiece according to claim 7, wherein said sound processing system reduces feedback in said earpiece.

9. A communications earpiece according to claim 1, wherein said connector connects the communications earpiece to a two-way communications device.

10. A communications earpiece according to claim 9, wherein said two-way communications device is a cellular phone.

11. A communications earpiece according to claim 9, wherein said wired connector plugs into a headset jack in said two-way communications device.

12. A communications earpiece according to claim 1, including means for manipulating signals to correct for hearing impairment.

13. A communications earpiece according to claim 12, wherein said means for manipulating signals is a multiband compression system.

14. A communications earpiece according to claim 1, further comprising:
    an auto-balancing circuit for adjusting gain of signals sent between said earpiece and said external device so as to ensure that signal levels are compatible.

15. A communications earpiece according to claim 14, wherein said auto-balancing circuit is located in a connector which connects said communications earpiece to a two-way communications device.

16. A communications earpiece according to claim 1, comprising:
    at least one anti-feedback circuit for reducing feedback between outgoing and incoming signals.

17. A communications earpiece according to claim 14, wherein said anti-feedback circuit is located in a connector which connects said communications earpiece to a two-way communications device.

18. A communications earpiece according to claim 1, comprising a second ear canal tube, wherein a first end of said second ear canal tube is connected to an input of said microphone and a second end of said ear canal tube is open for positioning near the ear canal, such that ambient sounds enter said second end and propagate through the second ear canal tube to the input of the microphone, said microphone being sized to fit within said ear canal.

19. A communications earpiece according to claim 1, comprising:
    noise cancellation means for cancelling noise detected in said ear canal.

20. The communications earpiece of claim 1, wherein the microphone, speaker and sound processor are positioned adjacent to the ear of a user.

21. A communications earpiece comprising:
    an ear canal tube sized for positioning in an ear canal of a user so that the ear canal is at least partially open for directly receiving ambient sounds;
    a sound processor for amplifying ambient sounds received by a microphone to produce processed signals;
    a wired connector for connecting said communications earpiece to at least one external device wherein the processed signals produced by the sound processor are sent to the external device through said connector and signals from the external device are sent to the earpiece through the connector to be broadcast by a speaker into said ear canal tube; and
    a second ear canal tube, wherein a first end of said second ear canal tube is connected to the input of said microphone and a second end of said ear canal tube is open and is located in said ear canal wherein ambient sounds enter said second end and propagate through the second ear canal tube to the input of the microphone wherein said microphone is located within said ear canal.

22. A communications earpiece, comprising:
    an ear canal tube sized for positioning in an ear canal of a user so that the ear canal is at least partially open for directly receiving ambient sounds;
    a sound processor for amplifying ambient sounds received by a microphone to produce processed signals; and
    a wired connector for connecting said communications earpiece to at least one external device wherein the processed signals produced by the sound processor are sent to the external device through said connector and signals from the external device are sent to the earpiece through the connector to be broadcast by a speaker, wherein said speaker is located at one end of said first ear canal tube located in said ear canal and is electrically connected to said sound processor via wires in said first ear canal tube.

23. A communications earpiece comprising:

an ear canal tube sized for positioning in an ear canal of a user so that the ear canal is at least partially open for directly receiving ambient sounds;

a sound processor for amplifying ambient sounds received by a microphone to produce processed signals;

a wired connector for connecting said communications earpiece to at least one external device wherein the processed signals produced by the sound processor are sent to the external device through said connector and signals from the external device are sent to the earpiece through the connector to be broadcast by a speaker into said ear canal tube; and a second ear canal tube wherein the microphone is located at one end of said second ear canal tube in said ear canal and is electrically connected to said sound processor via wires in said second ear canal tube.

24. A communications earpiece according to claim 23, wherein said speaker is located at one end of said first ear canal tube located in said ear canal and is electrically connected to said sound processor via wires in said first ear canal tube.

25. A communications earpiece, comprising:

a sound processor for processing ambient sounds received by a microphone to produce processed sound signals; and a wired connector for connecting said communications earpiece to at least one external device wherein the processed sound signals produced by the sound processor are sent to the external device through said connector and signals from the external device are sent to the earpiece through the connector to be broadcast by a speaker into the ear canal, said communications earpiece being configured for positioning in said ear of a user so that the ear canal is at least partially open for directly receiving ambient sounds.

26. A communications earpiece according to claim 25, wherein said sound processor includes a multiband compression system for modifying the received ambient sounds to improve intelligibility of the signal.

27. A communications earpiece according to claim 26, wherein said multiband compression system reduces gain of background noise at low frequencies in said received ambient sounds.

28. A communications earpiece according to claim 26, wherein said multiband compression system increases gain of low energy, high frequency signals in said received ambient sounds.

29. A communications earpiece according to claim 26, wherein said connector connects the communications earpiece to a two-way communications device.

30. A communications earpiece according to claim 29, wherein said two-way communications device is a cellular phone.

31. A communications earpiece according to claim 29, wherein said wired connector plugs into a headset jack in said two-way communications device.

32. A communications earpiece according to claim 25, wherein the connector connects the communications earpiece to a personal communications node.

33. A communications earpiece according to claim 32, wherein said personal communications node connects to a two-way communications device so as to allow signals to pass between the earpiece and the two-way communications device.

34. A communications earpiece according to claim 32, wherein said personal communications node includes a sound processing system.

35. A communications earpiece according to claim 34, wherein said sound processing system reduces feedback in said earpiece.

36. A communications earpiece according to claim 25, including means for manipulating signals to correct for hearing impairment.

37. A communications earpiece according to claim 36, wherein said means for manipulating signals is a multiband compression system.

38. A communications earpiece according to claim 25, comprising:

an auto-balancing circuit for adjusting gain of signals sent between said earpiece and said device so as to ensure that signal levels are compatible.

39. A communications earpiece according to claim 38, wherein said auto-balancing circuit is located in a connector which connects said communications earpiece to said two-way communications device.

40. A communications earpiece according to claim 25, comprising:

at least one anti-feedback circuit for reducing feedback between the earpiece and the external device.

41. A communications earpiece according to claim 40, wherein said anti-feedback circuit is located in a connector which connects said communications earpiece to a cellular phone.

42. The communications earpiece of claim 25, wherein the microphone, speaker and sound processor are positioned adjacent to the ear of a user.

* * * * *

UNITED STATES PATENT AND TRADEMARK OFFICE
CERTIFICATE OF CORRECTION

PATENT NO. : 6,181,801 B1
DATED : January 30, 2001
INVENTOR(S) : Jon Taenzer, Steven H. Puthoff and Vincent Pluvinage It is certified that error appears in the above-identified patent and that said Letters Patent is hereby corrected as shown below:

<u>Title page,</u>
Item [75] Inventors: should read as follows:
Jon C. Taenzer, Los Altos; Steven H. Puthoff, Saratoga; Vincent Pluvinage, Atherton;
all of CA (US)

Signed and Sealed this

Twenty-first Day of August, 2001

Attest:

*Nicholas P. Godici*

NICHOLAS P. GODICI
*Attesting Officer*   *Acting Director of the United States Patent and Trademark Office*